United States Patent [19]

Fuerst et al.

[11] Patent Number: 4,841,812
[45] Date of Patent: Jun. 27, 1989

[54] DEVICE FOR CONTROLLING MOVEMENTS OF COVERS IN SLIDING AND LIFTING ROOFS, AND SLIDING AND LIFTING ROOF UTILIZING SAME

[75] Inventors: Arpad Fuerst, Munich; Bernhard Wingen, Feldkirchen, both of Fed. Rep. of Germany

[73] Assignee: Webasto AG Fahrzeugtechnik, Gauting, Fed. Rep. of Germany

[21] Appl. No.: 219,442

[22] Filed: Jul. 14, 1988

[30] Foreign Application Priority Data

Jul. 16, 1987 [DE] Fed. Rep. of Germany ....... 3723453

[51] Int. Cl.$^4$ .......................... F16H 5/52; B60J 7/057
[52] U.S. Cl. ...................................... 74/810; 296/223
[58] Field of Search ................... 74/810, 804; 296/223

[56] References Cited

U.S. PATENT DOCUMENTS

| | | | |
|---|---|---|---|
| 1,598,586 | 8/1926 | Lanquetin | 74/810 X |
| 2,909,080 | 10/1959 | Gratzmuller | 74/810 |
| 2,999,356 | 9/1961 | Ferguson, Jr. | 74/810 X |
| 3,360,997 | 1/1968 | Whitaker | 74/810 X |
| 4,333,362 | 6/1982 | Sugioka et al. | 74/810 X |
| 4,466,658 | 8/1984 | Fürst et al. | 74/804 X |
| 4,501,169 | 2/1985 | Stilin | 74/810 X |
| 4,598,621 | 7/1986 | Weinhold | 74/810 X |
| 4,615,336 | 10/1986 | Fijimoto | 74/810 X |
| 4,651,594 | 3/1987 | Vogel et al. | 74/810 |
| 4,659,140 | 4/1987 | Fuerst et al. | 296/223 |

FOREIGN PATENT DOCUMENTS

| | | | |
|---|---|---|---|
| 0380086 | 9/1923 | Fed. Rep. of Germany | 74/810 |
| 1095783 | 12/1960 | Fed. Rep. of Germany | 74/810 |

*Primary Examiner*—Leslie A. Braun
*Assistant Examiner*—Harold F. Macris
*Attorney, Agent, or Firm*—Sixbey, Friedman, Leedom & Ferguson

[57] ABSTRACT

Device for controlling the sliding and lifting movements of a cover in sliding and lifting roofs of vehicles, which device has an input drive element and an output drive element from which both the sliding and the lifting movements are derived. To this end, there is provided a gear assembly having a planetary gear that is operationally controlled between the input drive and the output drive elements. During operation of the drive elements, starting from a predetermined gear position that corresponds to a reference cover position, the planetary gear automatically changes its gearing ratio, based upon the drive direction, in such a way that at equal input drive speeds, the lifting movement is slower than the sliding movement. The gear assembly has a double epicyclic gear. Additionally, a blocking device is provided which, when driving the input drive element from the predetermined gear position automatically blocks either a first or a second gear element of the epicyclic gear, depending on the drive direction.

20 Claims, 4 Drawing Sheets

DEVICE FOR CONTROLLING MOVEMENTS OF COVERS IN SLIDING AND LIFTING ROOFS, AND SLIDING AND LIFTING ROOF UTILIZING SAME

BACKGROUND OF THE INVENTION

The invention relates to a device for controlling the sliding and lifting movements of a cover for a sliding and lifting vehicle roof having an input drive element and an output drive element, and a gear assembly with a planetary gear which functions between the input drive element and the output drive element. More particularly, to a device for such a roof wherein the gear assembly, during operation of the drive elements, starting from a predetermined gear position corresponding to a cover reference position, automatically changes its gearing ratio on the basis of the drive direction in such a way that, at equal input drive speeds, the lifting movement produced is slower than the sliding movement.

In a prior art device of this kind (German Pat. No. 34 33 600 corresponding to U.S. Pat. No. 4,657,594), a clutch is provided having an axially adjustable gear, rendering the planetary gear effective for the lifting movement while creating a direct connection between the input drive element and the output drive element for the sliding movement.

Further there is disclosed an apparatus for controlling the sliding and lifting movements of a roof cover, wherein a rotatable hub input element is in driving connection with a driving pinion output element for producing sliding of the cover, and wherein a reduction stage (which may be a planetary gear arrangement) is engaged by an axial shifting of a control gear for driving the driving pinion to produce a tilting movement at a transmission ratio that is reduced relative to that for the sliding movement.

It is also known from a prior development of the present inventors, that is described in German Offenlegungsschrift No. 35 45 869 and corresponding U.S. Pat. No. 4,659,140, to provide a dual epicyclic gear for driving the cover assembly of a vehicle roof. However, the gear disclosed there is a distributor gear having two output drive elements which are to be driven individually or jointly with different ratios. That is, through the use of a reversing mechanism, one output drive element produces a lifting or lowering movement or another output element produces sliding of a roof cover, or both output drive elements are simultaneously operated to produce both lifting and sliding movements, the lifting and lowering produced by one output element being reduced relative to the sliding movement produced by the other output element.

SUMMARY OF THE INVENTION

A primary objective of the invention is to provide a control device of the kind mentioned above which eliminates the need for a supplemental clutch or axially shiftable control gear.

This objective is achieved, in accordance with a preferred embodiment of the invention, through the use of a gear assembly that has a double epicyclic gear, and by providing a blocking device which, during operation of the drive element, based on the drive direction relative to a starting point at a predetermined gear position, automatically blocks a first or second gear element of the double epicyclic gear.

The inventive control device, like the devices disclosed in German Pat. No. 34 33 600 and U.S. Pat. No. 4,651,594, permits an output drive element to be operated with different ratios between the input drive element and the output drive element, during operation of the drive elements, starting from a predetermined gear position, based on the drive direction. It does not, however, require the use of an additional clutch or axially shiftable control gear. All gear elements, in fact, are continuously in mutual engagement.

More particularly, the present invention utilizes first and second gear elements that are retained in a predetermined gear position in which the dual epicyclic gear is blocked. However, the blocking device automatically releases either the first or the second gear element during operation of the drive element based upon the drive direction relative to the predetermined gear position. The blocking of the double epicyclic gear prevents, in the predetermined position of the gear, an undesirable displacement from the output drive side. In the instance of a manual drive, the above arrangement aids in indicating when the cover reference position has been reached. It is to be understood that, for a sliding and lifting roof having a cover which can be slid under a fixed roof surface, the cover reference position in the closed position of the cover, while, in the case of a sliding and lifting roof having a cover which can be moved rearwardly above the fixed roof portion (a so-called spoiler roof), the reference cover position is that position in which the cover assumes its forward end position with the cover fully raised.

The blocking device can have two blocking pawls which, in the predetermined gear position, lockingly engage the first or second gear elements, respectively, whereby, starting from the predetermined gear position, when operating the drive elements in one direction or the other, one of the respective blocking pawls is automatically forced out of its blocking engagement. Advantageously, the blocking pawls engage a blocking recess of the first or second gear element, in the predetermined gear position, under the influence of bias springs. To this end, the blocking pawls and the blocking recesses, appropriately, having interacting inclined planes which cause the respective blocking pawl to be released from its blocking recess engagement against the force of bias springs during the operation of the drive element in one or the other direction, starting from the predetermined gear position.

In a further refinement of the invention, in order to additionally enhance the safeguards against malfunctioning, a switch-lock device for the blocking pawls is provided. This switch-lock, after one of the two blocking pawls has been moved out of engagement, prevents disengagement of the other pawl. A particularly uncomplicated design is achieved when the blocking pawls extend parallel to each other in guide channels, with the channels being separated by a partition. A blocking member is supported in an opening of the partition, and is movable perpendicularly relative to the moving direction of the pawls. Furthermore, the blocking member is dimensioned to be larger than the thickness of the partition in the direction which is perpendicular to the moving direction of the blocking pawls. Each of the blocking pawls is provided with a recess into which the blocking member can enter for blocking movement of one pawl while, simultaneously, releasing the other pawl. The blocking member may simply consist of ball. This switch lock is similar to the reversing device of the embodiment of FIGS. 15-17 of the above-mentioned U.S. Pat. No. 4,659,140.

The double epicyclic gear may have two sun gears that are connected for rotation with the drive element, but which are offset in an axial direction relative to each other. Each of the two sun gears, respectively, mesh with at least a first or a second planetary gear. The first and second planetary gears are freely rotatable on a common planetary gear carrier and are in meshing engagement with a respective first, or second, internally toothed outer gear, the outer gears being axially offset relative to each other and one of the outer gears being connected with the output drive element in a torque transmitting manner. Appropriately, the common planetary gear carrier and the other of the outer gears may form the first gear element cooperating with the blocking device or may form the second gear element respectively.

A particularly compact design is achieved if care is taken that the rotational axis of the input drive element and the output drive element coincide. Furthermore, compactness of design is further facilitated when the rotational axes of the sun gears, the planetary wheel carrier and the outer gears coincide with the rotational axes of the drive element and the output drive element. Preferably, the two outer gears and the planetary gear carrier are provided with coaxial bearing surface which interengage in pairs.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE PREFERRED EMBODIMENT

Figure 1:
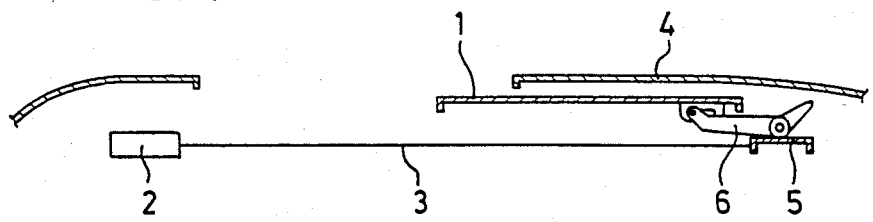
FIG. 1 is a schematic longitudinal sectional view through a vehicle roof with the cover pushed back.
Figure 2:
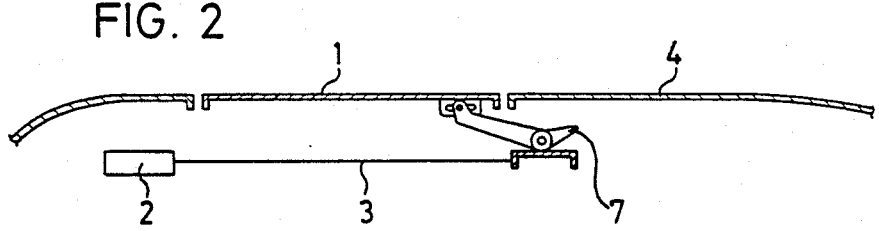
FIG. 2 is a sectional view according to FIG. 1, with the cover in the closed position.
Figure 3:
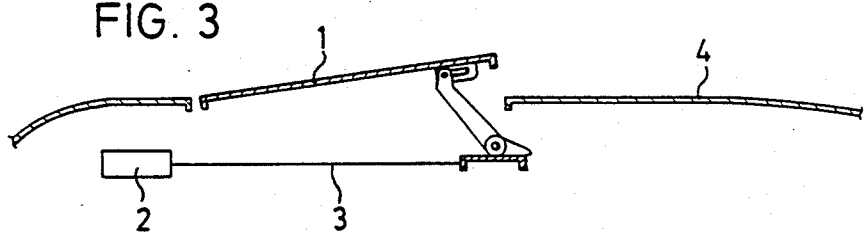
FIG. 3 is a sectional view according to FIGS. 1 and 2, with the cover in an upwardly extended position.

FIGS. 1-3 show how a cover 1 of a sliding and lifting roof can be shifted, selectively, from a closed position, as depicted in FIG. 2, to a position wherein the cover is slid rearwardly below a fixed roof portion 4 (FIG. 1) via pressure-resistant cables 3 by way of drive element 2, or to a position wherein the cover 1 is pivotally lifted as depicted in FIG. 3. In the example depicted, cables 3 are connected with a transport bridge 5, having a lever mechanism 6, which is connected with cover 1 and is guided in a retaining bracket guide, not depicted, at reference numeral 7. The details of such conventional structure of a sliding and lifting roof have been eliminated, for clearer illustration, and do not, themselves, form part of this invention which is directed to a drive control device, serving as drive element 2, of an otherwise conventional roof.

Figure 4:
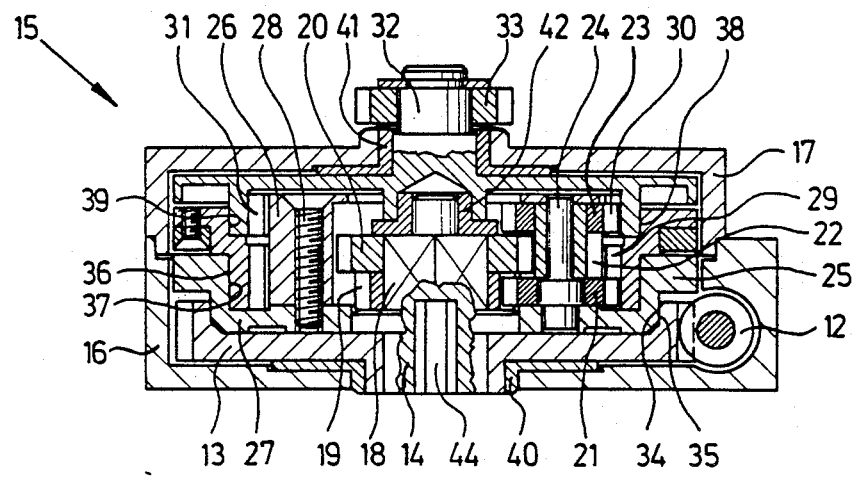
FIG. 4 is an enlarged sectional view of a gear assembly for operating the drive element of the cover taken along line IV—IV of FIG. 6.
Figure 5:
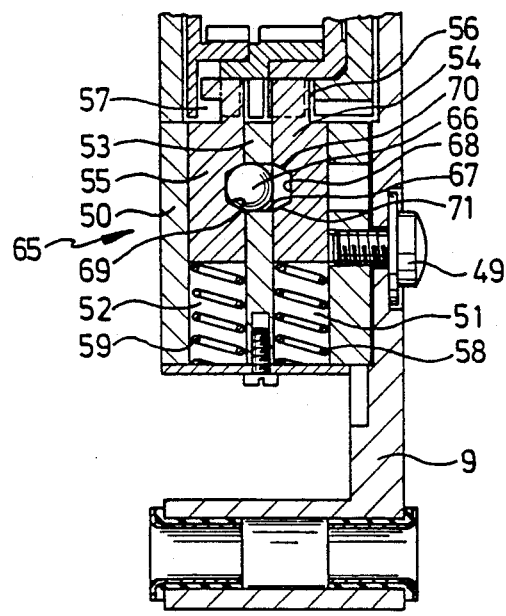
FIG. 5 is a sectional view of the gear assembly taken along line V—V of FIG. 6.
Figure 6:
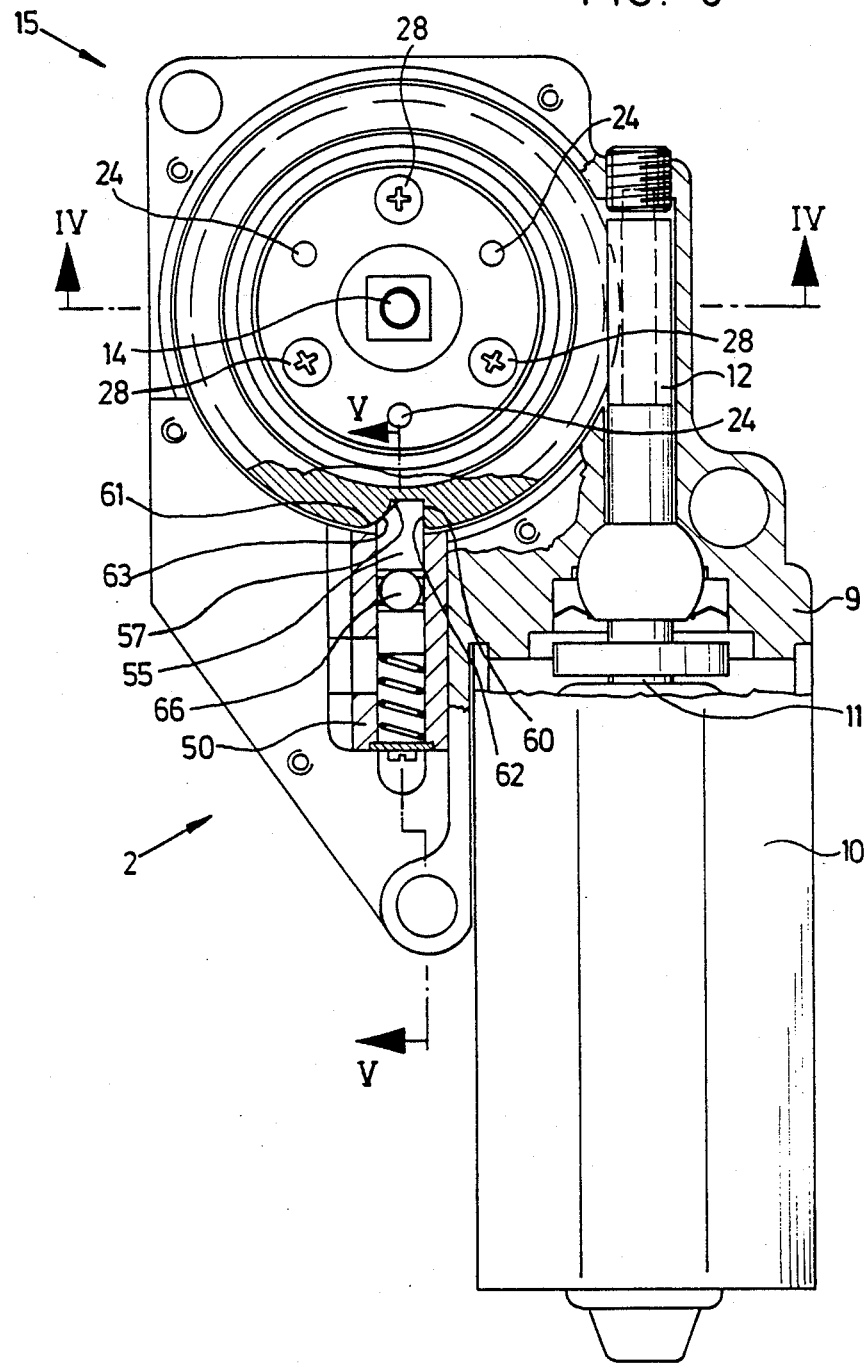
FIG. 6 is a partial, sectional top view onto the gear assembly according to FIGS. 4 and 5, with a drive motor.

A first example of drive element 2 is depicted, in detail, in FIGS. 4-6, where an electric motor 10, whose drive shaft 11 is connected with a worm 12, is seated on a carrier plate 9. Worm 12 meshes with a worm gear 13, which is connected to rotate with a shaft 14 on the drive (input) side of a double epicyclic gear 15. The double epicyclic gear 15 is secured in a housing which is formed by a housing base 16, cast onto carrier plate 9, and an upper housing part 17 mounted thereon. Two sun gears 19 and 20 are secured to rotate with shaft 14 via flat pieces 18, and are disposed in an axially offset relationship with respect to each other. Sun gear 19 meshes with three planetary gears 21 which are peripherally offset relative to each other by an angle of 120 degrees, and only one of which is depicted in FIG. 4. Sun gear 20 engages lower parts 22 of three planetary gears 23, which are designed as step gears. The planetary gears 21 and 23 are freely rotatably mounted onto three shaft 24. The shafts 24 are spaced an equal radial distance from shaft 14 and are uniformly distributed around shaft 14 at positions that are set at 120 degree angular increments. The opposite ends of shaft 24 are respectively supported in a base 25 and in an upper part 26 of a common planetary gear carrier 27, by way of screws 28.

Planetary gears 21 meshingly engage a first internally toothed outer gear 29, while an upper part 30 of planetary gears 23, having a larger diameter than the lower part 22, meshingly engages a second internally toothed outer gear 31. The outer gears 29 and 31 are disposed in an axially offset configuration relative to each other. A stub shaft 32 is disposed on second outer gear 31 and may be molded thereto. A pinion 33 is connected to stub shaft 32 so as to rotate with it. Pinion 33, on its part, engages cables 3. As can be seen, particularly from FIG. 4, the rotational axes of the drive side of shaft 14, the output drive pinion 33, the sum gears 19, 20 of the planetary gear carrier 27, and the outer gears 29, 31, all coincide.

The base of planetary gear carrier 27 has a cylindrical bearing surface 34 which engages a cylindrical bearing surface 35 of worm gear 13. Base 25 of planetary gear carrier 27 also has a cylindrical bearing surface 36 that cooperates with a cylindrical bearing surface 37 of outer gear 29. Another cylindrical bearing surface 38 of outer gear 29 interacts with a cylindrical bearing surface 39 of outer gear 31. Gears 13, 29, 31 and the planetary gear carrier 27 support each other across a large area on bearing surfaces 34 to 39. Worm gear 13 and outer gear 31, that are drivingly connected with pinion 33, are axially disposed at both sides of planetary gear carrier 27 and are, respectively, supported in housing base 16 and housing upper part 17 by means of bushings 40, 41. Furthermore, outer gear 31 is pivotally supported in its center section on a cylindrical extension of shaft 14 by way of a bushing 42. Adjacent to cylindrical bearing surfaces 34, 37 of planetary gear carrier 27 and of outer gears 29, 31, there are corresponding smooth bearing surfaces across which the above gear elements are supported, in an axial direction, on the respective lower component, i.e., worm gear 13, a base 25 of planetary gear carrier 27, or outer gear 29. Worm gear 13 has a concentric hexagon socket 44, opening downwardly, which permits emergency manual actuation of cover 1 by means of an appropriate tool, in the event of a malfunction of electric motor 10 or an inadequate current supply.

A blocking device 65 (FIGS. 5 and 6) is coordinated with the double epicyclic gear 15. Blocking device 65 has a lock bar housing 50 that is connected with carrier plate 9 by screw 49 and which forms two guide channels 51, 52, that are separated by a partition 53. These guide channels are parallel to each other and extend radially relative to the axis of shaft 14. In each guide channel 51, 52, there is a slidable blocking pawl 54, 55. At the periphery of outer gear 29, as well as at the base 25 of planetary gear carrier 27, there are blocking recesses 56 and 57. The configuration is such that the blocking recesses 56, 57 are circumferentially aligned, respectively, with the end of channel 51 facing gear 15, and the end of channel 52 adjacent to gear 15 (i.e., recess 56 forms a continuous radial passage with channel 51 as does recess 57 with channel 52) when the gear 15 is in the predetermined position where cover 1 assumes the closed position of FIG. 2. In this predetermined gear position, both blocking pawls 54, 55, under the influence of bias springs 58, 59 that act upon that side of the blocking panels 54, 55 which faces away from gear 15, engage blocking recesses 56, 57, respectively (FIG. 5).

The blocking recesses 56, 57 are defined by a surface 60 which extends essentially in a radial direction, and by an inclined plane 61, as further depicted in FIG. 6, for the blocking recess of outer gear 29. Accordingly, blocking pawls 54, 55, at their ends facing gear 15, have a corresponding radially extending outer surface 62 and an inclined plane 63 which complements inclined plane 61.

A spherical blocking member 66, cooperates with blocking pawls 54, 55. Blocking member 66 is supported in an opening 67 of partition 53 in such a way that, depending upon displacement of blocking pawls 54, 55 it can execute a movement which is normal to the moving direction of the blocking pawls. The diameter of blocking member 66 is larger than the thickness of partition 53 so that blocking member 66 projects beyond partition 53, at one or both sides thereof, and so as to preclude disengagement of both blocking pawls 54, 55 at the same time. To this end, the projecting portion of blocking member 66 can be received by recess 68 and/or recess 69 of blocking pawls 54 or 55, respectively. The recesses 68, 69 are defined by inclined planes 70, 71 that extend in a radial direction toward and away from shaft 14, respectively.

When cover 1 is in the closed position of FIG. 2 (this being the reference position for a sliding and lifting roof), both blocking recesses 56, 57 of the planetary gear carrier 27 and of outer gear 29 are aligned with guide channels 51, 52 of lock bar housing 50. Thus, the blocking pawls 54, 55, acted upon by bias springs 58, 59, engage blocking recesses 56, 57, thereby locking the double epicyclic gear 15.

In the event that electric motor 10 is started with a rotational direction of worm 12 such that it drives worm gear 13 in a clockwise direction (when viewed from below relative to FIG. 4), driving force is exerted onto planetary gear carrier 27 via planetary gears 21 in a clockwise direction and is likewise exerted onto outer gear 29 in counterclockwise direction. Interaction between inclined plane 61 of blocking recess 56 and inclined plane 63 of blocking pawl 54 causes planetary gear carrier 27 to effect disengagement of blocking pawl 54 from recess 56. Consequently, planetary gear carrier 27 is able to freely rotate. On the other hand, outer gear 29 remains blocked by the effects of its radial surface 60 engaging radial surface 62 of blocking pawl 55. Displacement of pawl 54 causes locking member 66 to be pushed into the FIG. 5 position by way of inclined plane 70 of blocking pawl 54 causing blocking member 66 to engage recess 69 of blocking pawl 55. The surface of the blocking pawl 54 which is adjacent to the front recess 68 and faces partition 53, retains blocking element 66 in this position, so that an unintentional disengagement of blocking pawl 55 is not possible.

Sun gear 20 is, likewise, driven in a clockwise direction by shaft 14 and it drives outer gear 31, and along with it, pinion 33 in a counterclockwise direction via planetary gears 23. To this end, a ratio of high gearing to low speed between shaft 14 and pinion 33 is effective so that cover 1 can be brought into any desired upwardly extended position, ranging from the FIG. 2 closed position to the FIG. 3 fully extended position, with a high degree of responsiveness to the touch. In the event that the rotational direction of electric motor 10 is reversed with the cover 1 fully extended, disengaged blocking pawl 54, coacting with blocking member 66, prevents a disengagement of blocking pawl 55. Thus, outer gear 29 continues to be blocked as the cover 1 is lowered toward the closed position (FIG. 2).

If, starting from the closed FIG. 2 position, the electric motor 10 is started in an opposite rotational direction such that worm gear 13 is turned in a counterclockwise direction, driving force is exerted onto planetary gear carrier 27 and outer gear 29 via sun gear 19 and planetary gears 21 in a direction which causes planetary gear carrier 27 to attempt to turn in a counterclockwise direction, and outer gear 29 to turn in a clockwise direction, i.e., according to the top view in FIG. 6, in a counterclockwise direction. In such a rotational drive direction, outer gear 29, via its inclined plane, forces blocking pawl 55 out of its blocking recess 57, while blocking pawl 54 remains in engagement with blocking recess 56 of planetary gear carrier 27. Pinion 33 (as viewed from below in FIG. 4) is driven in a clockwise direction by sun gear planetary gear 23 and outer gear 31. Such a rotational direction of pinion 33 causes cover 1, starting from the closed position of FIG. 2, to be slid rearwardly below the fixed roof portion 4 (FIG. 1). To this end, a ratio of relatively low gearing to low speed is effective between shaft 14 and pinion 33.

A forcing of blocking pawl 55 from engagement with blocking recess 57 causes blocking member 66 in FIG. 5 to execute a sliding movement to the right so that it now engages recess 68 of blocking pawl 54 and is retained in this position by disengaged pawl 55. Thus, the blocking conditions described above are maintained even when cover 1 is displaced from the fully slid back position or from an intermediate position between being fully slid back and fully closed, by reversing the drive direction of electric motor 10 to a direction towards the closed position. Blocking member 66 is not released again until the cover reaches the closed position.

Figure 7:
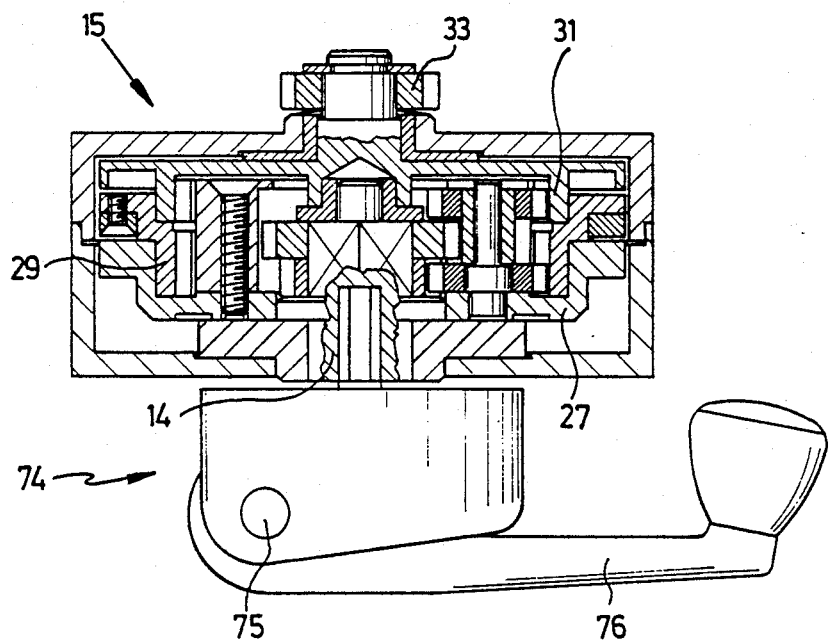
FIG. 7 is a sectional view, similar to FIG. 4, of the gear assembly with a manual drive.

A variation of the above concept, depicted in FIG. 7, shows a hand crank 74, drivingly connected to the input side of shaft 14, instead of having a motor drive with electric motor 10, worm 12 and worm gear 13. Hand crank 74 is designed in a conventional manner as a folding crank having a crank arm 76 that is tiltable around a joint bolt 75. Apart from the substitution of a crank drive for a motor drive, the structure and operation of the FIG. 7 version is the same as that described above.

While FIGS. 1-3 show a sliding lifting roof having a cover which can be slid below the fixed roof portion 4, it is to be understood that drive assembly 2 is very suitable for use in a so-called spoiler roof, where the upwardly extended cover is slid rearwardly above the fixed roof portion 4. In such a roof, the reference cover position is the fully extended position with the cover being in its frontal end position instead of the closed position. Likewise, a gearing arrangement could be utilized wherein the outer gears 29, 31 rotate in the same direction, such merely requiring the inclined plane surfaces 61, 63 of one outer gear to face in the opposite circumferential direction of those of the other outer gear to produce the same operation described herein. As such, it should be recognized that, since the invention is susceptible of numerous changes and modifications as known to those skilled in the art, we do not wish to be limited to the detailes shown and described herein, but intend to cover all such changes and modifications as are encompassed by the scope of the appended claims.

We claim:

1. A device for controlling sliding and lifting movements of a cover of a sliding and lifting roof of a vehicle, comprising an input drive element, an output drive element, and a gear assembly which is operationally disposed between the input drive element and the output drive element in a manner for producing, starting from a predetermined gear position, a gearing ratio which changes automa ically on the basis of the drive direction in such a way that, at equal input drive speeds, a lifting movement is produced by said output drive element in one drive direction that is slower than a sliding movement that is produced by said output drive element in an opposite drive direction, wherein the gear assembly has a double epicyclic gear and a blocking device is provided which automatically blocks a first element of the double epicyclic gear when the input drive element is driven starting, from the predetermined gear position, in a first direction and automatically blocks a second gear element of the epicyclic gear when driven from said predetermined position in a second, opposite, direction.

2. The device according to claim 1, wherein in the predetermined gear position, both of the first and second gear elements are blocked, thereby blocking the double epicyclic gear; and wherein the blocking device automatically releases the second gear element when the drive element is driven from the predetermined gear position in said first direction and automatically releases said first gear when the drive element is driven from the predetermined position in said second direction.

3. The device according to claim 2, wherein the blocking device has two blocking pawls, each of which blockingly engage a respective one of the first and second gear elements in said predetermined gear position, and upon driving the input drive element in the first and second directions, starting from the predetermined gear position, a respective one of said blocking pawls is automatically moved out of its blocking engagement.

4. The device according to claim 3, wherein bias springs are provided for producing said engagement of each blocking pawl in the respective blocking recess of the first and second gear elements.

5. The device according to claim 4, wherein each of the blocking pawls has an inclined plane surface for interacting with an inclined plane surface of a respective blocking recess as a means for forcing the respective blocking pawl out of the blocking recess against the effect of said bias springs.

6. The device according to claim 5, further comprising a switch-lock device which cooperates with the blocking pawls as a means for preventing, subsequent to said moving of one of the two blocking pawls from blocking engagement, disengagement of the other blocking pawl from its blocking engagement.

7. The device according to claim 6, wherein the blocking pawls extend parallel to each other, in guide channels separated by a partition having an opening therein; wherein said switch lock is a blocking member that is mounted in the opening of the partition in a manner which enables the blocking member to be displaceable normal to the moving direction of the pawls; wherein the blocking member is dimensioned so as to be larger than the thickness of the partition normal to the moving direction of the blocking pawls; and wherein each blocking pawl is provided with a recess within which the blocking member can enter for blocking of one pawl while simultaneously releasing the other pawl.

8. The device according to claim 7, wherein the blocking member is ball shaped.

9. The device according to claim 3, further comprising a switch-lock device which cooperates with the blocking pawls as a means for preventing, subsequent to said moving of one of the two blocking pawls from blocking engagement, disengagement of the other blocking pawl from its blocking engagement.

10. The device according to claim 9, wherein the blocking pawls extend parallel to each other, in guide channels separated by a partition having an opening therein; wherein said switch locking is a blocking member that is mounted in the opening of the partition in a manner which enables the blocking member to be displaceable normal to the moving direction of the pawls; wherein the blocking member is dimensioned so as to be larger than the thickness of the partition normal to the moving direction of the blocking pawls; and wherein each blocking pawl is provided with a recess within which the blocking member can enter for blocking of one pawl while simultaneously releasing the other pawl.

11. The device according to claim 10, wherein the blocking member is ball shaped.

12. The device according to claim 1, wherein the rotational axes of the input drive element and of the output drive element coincide.

13. A device for controlling sliding and lifting movements of a cover of a sliding and lifting roof of a vehicle, comprising an input drive element, an output drive element, and a gear assembly which is operationally disposed between the input drive element and the output drive element in a manner for producing, starting from a predetermined gear position, a gearing ratio which changes automatically on the basis of the drive direction in such a way that, at equal input drive speeds, a lifting movement is produced by said output drive element in one drive direction that is slower than a sliding movement that is produced by said output drive element in an opposite drive direction; wherein the gear assembly has a double epicyclic gear and a blocking device is provided which automatically blocks a first element of the double epicyclic gear when the input drive element is driven starting, from the predetermined gear position, in a first direction and automatically blocks a second gear element of the epicyclic gear when driven from said predetermined position in a second, opposite, direction; wherein the rotational axes of the input drive element and of the output drive element coincide; wherein the double epicyclic gear has two sun gears that are connected for rotation with the input drive element and which are axially offset relative to each other, and first and second planetary gears each of which meshes with at least one of the sun gears; wherein the first and second planetary gears are freely rotatably supported on a common planetary gear carrier and are in meshing engagement with a respective one of first and second internally toothed outer gears; wherein the outer gears are axially offset relative to each other; and wherein one of the first and second outer gears is drivingly connected with the output drive element.

14. The device according to claim 13, wherein the common planetary gear carrier and the other of the outer gears each form one of said first and second gear elements which are blocked by the blocking device.

15. The device according to claim 13, wherein the rotational axes of the sun gears, the planetary gear carrier, and the outer gears coincide with the rotational axes of the input drive element and the output drive element.

16. The device according to claim 13, wherein the two outer gears and the planetary gear carrier have coaxial bearing surfaces which interengage in pairs.

17. A sliding and lifting roof for a vehicle having a cover which is selectively displaceable from a closed position so as to be lifted into an upwardly extended position and so as to be slid into a retracted position, and a drive unit with an input drive element and a single output drive element that is coupled to said input drive element by a gear assembly, for producing displacements of the cover between said positions at differing speeds by a gear ratio which, starting from a reference cover position and a corresponding predetermined gear position, changes automatically on the basis of the drive direction in such a way that, at equal input drive speeds, a lifting movement is produced by said output drive element in one drive direction that is slower than a sliding movement that is produced by said output drive element in an opposite drive direction, wherein the gear assembly has a double epicyclic gear and a blocking device is provided which automatically blocks a first element of the double epicyclic gear, when the input drive element is driven starting from the predetermined gear position in a first direction and automatically blocks a second gear element of the epicyclic gear when driven from said predetermined position in a second, opposite, direction.

18. The roof according to claim 17, wherein in the predetermined gear position, both of the first and second gear elements are blocked, thereby blocking the double epicyclic gear; and wherein the blocking device automatically releases the second gear element when the drive element is driven from the predetermined gear position in said first direction and automatically releases said first gear when the drive element is driven from the predetermined position in said second direction; and wherein the blocking device has two blocking pawls, each of which blockingly engage a respective one of the first and second gear elements in said predetermined gear position and upon driving the input drive element in the first and second directions, starting from the predetermined gear position, a respective one of said blocking pawls is automatically moved out of its blocking engagement.

19. A sliding and lifting roof for a vehicle having a cover which is selectively displaceable from a closed position so as to be lifted into an upwardly extended position and so as to be slid into a retracted position, and a drive unit with an input drive element and an output drive element that is coupled to said input drive element by a gear assembly, for producing displacements of the cover between said positions at differing speeds by a gear ratio which, starting from a reference cover position and a corresponding predetermined gear position, changes automatically on the basis of the drive direction in such a way that, at equal input drive speeds, a lifting movement is produced by said output drive element in one drive direction that is slower than a sliding movement that is produced by said output drive element in an opposite drive direction, wherein the gear assembly has a double epicyclic gear and a blocking device is provided which automatically blocks a first element of the double epicyclic gear, when the input drive element is driven starting from the predetermined gear position in a first direction and automatically blocks a second gear element of the epicyclic gear when driven from said predetermined position in a second, opposite, direction; wherein the double epicyclic gear has two sun gears that are connected for rotation with the input drive element and which are axially offset relative to each other, and first and second planetary gears each of which meshes with at least one of the sun gears; wherein the first and second planetary gears are freely rotatably supported on a common planetary gear carrier and are in meshing engagement with a respective one of first and second internally toothed outer gears; wherein the outer gears are axially offset relative to each other; and wherein one of the first and second outer gears is drivingly connected with the output drive element.

20. The roof according to claim 19, wherein the rotational axes of the input drive element and of the output drive element coincide.

* * * * *